(12) United States Patent
Berger

(10) Patent No.: US 7,137,310 B2
(45) Date of Patent: Nov. 21, 2006

(54) TWIN-CLUTCH TRANSMISSION AND METHOD FOR CARRYING OUT A GEARSHIFT IN A TWIN-CLUTCH TRANSMISSION

(75) Inventor: Reinhard Berger, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 159 days.

(21) Appl. No.: 10/711,227

(22) Filed: Sep. 2, 2004

(65) Prior Publication Data

US 2005/0064990 A1    Mar. 24, 2005

Related U.S. Application Data

(63) Continuation of application No. PCT/DE03/00657, filed on Feb. 28, 2003.

(30) Foreign Application Priority Data

Mar. 7, 2002    (DE) .................................. 102 09 917

(51) Int. Cl.
    *F16H 3/08*    (2006.01)
(52) U.S. Cl. ........................................ 74/330

(58) Field of Classification Search .................. 74/330, 74/331, 335
See application file for complete search history.

(56) References Cited

U.S. PATENT DOCUMENTS

| 4,497,222 | A | 2/1985 | Nagaoka et al. |
| 6,460,425 | B1 * | 10/2002 | Bowen .................. 74/331 |

FOREIGN PATENT DOCUMENTS

| JP | 60184752 | 9/1985 |
| JP | 01218932 | 9/1989 |
| JP | 02089846 | 3/1990 |
| JP | 10184876 | 7/1998 |
| JP | 10299530 | 11/1998 |
| JP | 3277959 | 4/2002 |

* cited by examiner

*Primary Examiner*—Dirk Wright
(74) *Attorney, Agent, or Firm*—Simpson & Simpson, PLLC

(57) ABSTRACT

The invention relates to a method for carrying out a gearshift in a twin-clutch transmission, which is characterized in that a downshift is carried out subject to the kind of shift and/or of at least one predetermined vehicle parameter. The invention also relates to a twin-clutch transmission, especially for carrying out the inventive method.

20 Claims, 6 Drawing Sheets

- - - - disengaging clutch
........ engaging clutch
- - - internal combustion engine ——— internal combustion engine

TWIN-CLUTCH TRANSMISSION AND METHOD FOR CARRYING OUT A GEARSHIFT IN A TWIN-CLUTCH TRANSMISSION

CROSS-REFERENCE TO RELATED APPLICATIONS

This application is filed under 35 U.S.C. § 120 and § 365 (c) as a continuation of International Patent Application PCT/DE03/00657, filed Feb. 28, 2003, which application is incorporated herein by reference. This application also claims priority of German Patent Application No. 102 09 917.0, filed Mar. 7, 2002, which application is incorporated herein by reference.

BACKGROUND OF THE INVENTION

The present invention relates to a twin-clutch transmission and a method for carrying out gear shifting in a twin-clutch transmission.

Twin-clutch transmissions, especially parallel shift transmissions, are known from automotive technology. A parallel shift transmission (PST) preferably has two transmission input shafts, each of which is coupled to the engine shaft via a friction clutch.

In the parallel shift transmission (PST) having, for example, self-locking, electromotive actuators, it may occur that the transmission controller fails based on an error because of, for example, the failure of a lock or the like during a crossover shift, and both clutches transmit a torque to the transmission input shafts. If this also occurs in specific driving situations, e.g., on a slippery roadway, and the driver, moreover, backs off on the gas pedal because he notices the failure, the wheels can, for example, start to slip and a breakoff in the road-holding can occur.

OBJECTS OF THE INVENTION

The object of the invention is to propose a twin-clutch transmission and a method for carrying out gear shifting in a twin-clutch transmission with which secure and fuel-consumption-optimized shifting operations are carried out.

This objective can be achieved according to the invention in particular by a method for carrying out gear shifting in a twin-clutch transmission in which a downshifting is carried out as a function of the type of shifting and at least one predetermined vehicle parameter. A vehicle performance such as in a manual shift transmission or in an automated shift transmission (AST) may be achieved by a suitable parameterization of the shifting operations in a parallel shift transmission.

SUMMARY OF THE INVENTION

Within the context of a further development of the invention, it may be provided that a pulling downshift is carried out with a pulling force interruption, if an increased wheel slip probability is present as a vehicle parameter or if the pulling downshift is carried out in the parallel shift transmission in the cold-weather program. The recognition of the particular vehicle parameter may be accomplished using the engine, transmission control device or the like. In this way, it is possible to avoid dangerous vehicle situations, especially in pulling downshifts. It is also possible that other vehicle parameters are used to carry out a pulling force interruption during the pulling downshift.

Within the context of one design of the invention, it is also possible that a wheel slip probability parameter or the like is determined as a function of the actual wheel slip that is present. This parameter indicates the probability with which a wheel of the vehicle loses traction on the street surface. It is especially advantageous if the pulling force interruption during a pulling downshift is carried out as a function of the wheel slip probability parameter.

It is conceivable that in the detection of a wheel slip, the wheel slip probability parameter, for example, is set high and is then reduced again using an appropriate time function or the like, in particular the longer no more wheel slip is detected. Preferably, the pulling force interruption may be terminated according to a further development, if the wheel slip probability parameter is decreased. Thereafter, a pulling force restoration, for example, can be begun. Preferably, the degree or the level of pulling force restoration gets larger as the wheel slip probability parameters get smaller.

It may be provided according to the invention, for example, in a parallel shift transmission or twin-clutch transmission, that especially in a pushing downshift an engine torque intervention is carried out if an increased wheel slip probability is present as a vehicle parameter. A further development of the invention may also provide that the engine torque intervention is carried out if a low-temperature program is activated as a vehicle parameter. It is conceivable other vehicle parameters are also used in order to carry out an engine torque intervention. In this way, a parameterization is realized in particular with push downshifts in a parallel shift transmission.

Preferably, the engine torque is increased during the engine torque intervention by a double declutching or the like for a predetermined period, so that no overtorque or minimal overtorque on the clutch of the new, lower gear is reduced during the slip reduction after the gear change.

Within the context of another embodiment of the invention, an increased wheel slip probability may be present, for example, if the low-temperature program is activated by operation of a low-temperature sensor switch or another suitable switch is activated by the driver. Moreover, an increased wheel slip probability may be present if the wheels shortly beforehand have previously already lost traction one or more times. This may be detected, for example, when the wheels spin during acceleration by an intervention of the traction control system (ASR intervention), by an intervention of the antilock braking system (ABS intervention) or the like.

Furthermore, a twin-clutch transmission is proposed with a device for carrying out gear shifting as a function of the type of shifting and at least one predetermined vehicle parameter. The twin-clutch transmission according to the invention may preferably be used to carry out the proposed method. Preferably, a transmission control device or the like may be provided for the detection of at least one vehicle parameter.

BRIEF DESCRIPTION OF THE DRAWINGS

Additional advantages and advantageous designs arise from the dependent claims and the drawings described below. In the drawing:

DETAILED DESCRIPTION OF THE PREFERRED EMBODIMENT

Figure 1:
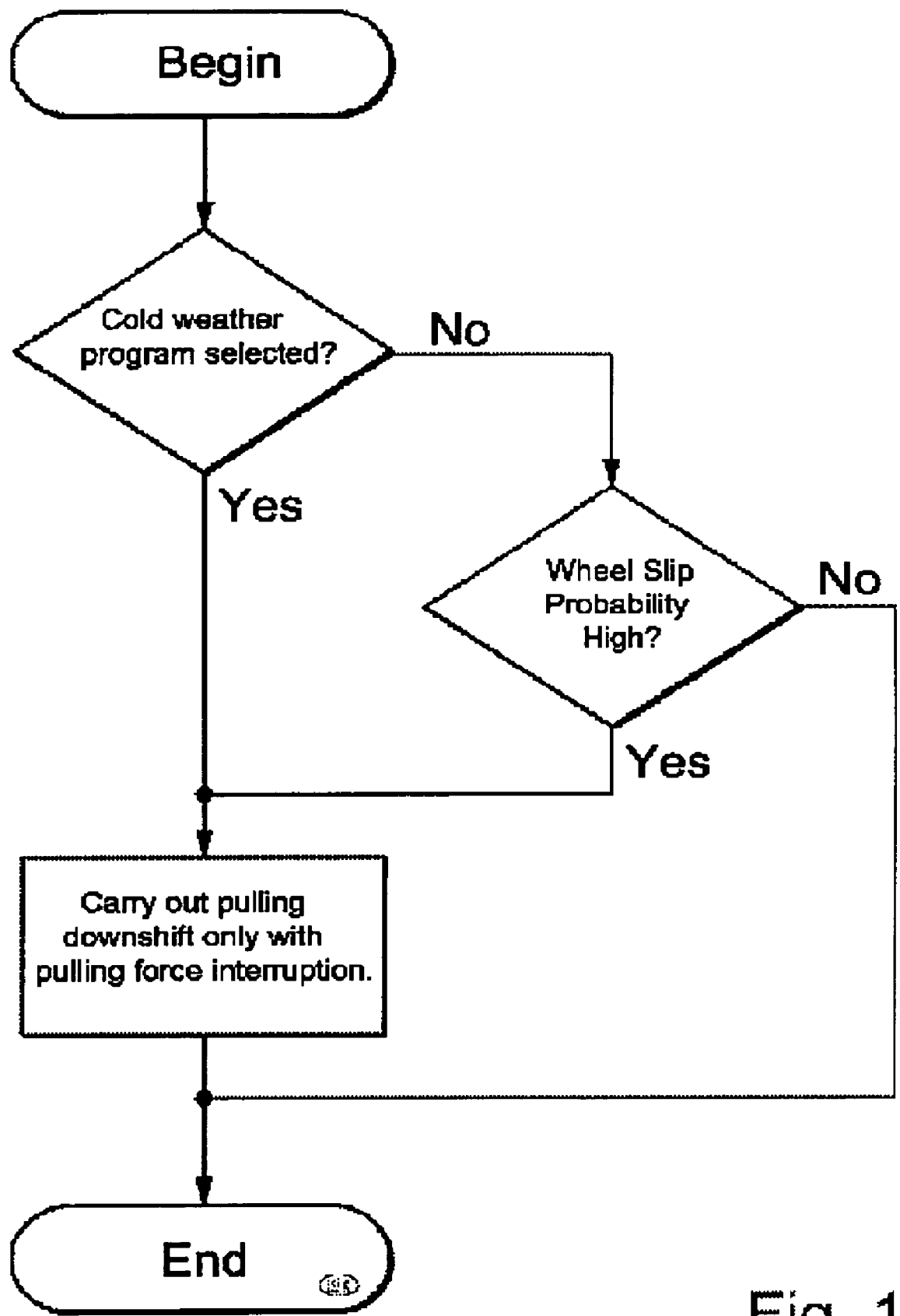
FIG. 1 shows a flow diagram of a first exemplary embodiment of a method of the invention.

In FIG. 1, a possible exemplary embodiment of the method of the invention for carrying out gear shifting in a twin-clutch transmission is shown in the form of a flow diagram.

At the beginning of the method, a check is made of whether a low-temperature program is selected. If so, a pulling downshift is carried out only with pulling force interruption. If not, a check is made of whether there is an excessive wheel slip. If so, a pulling downshift is carried out only with pulling force interruption. If not, the method is terminated.

Figure 2:
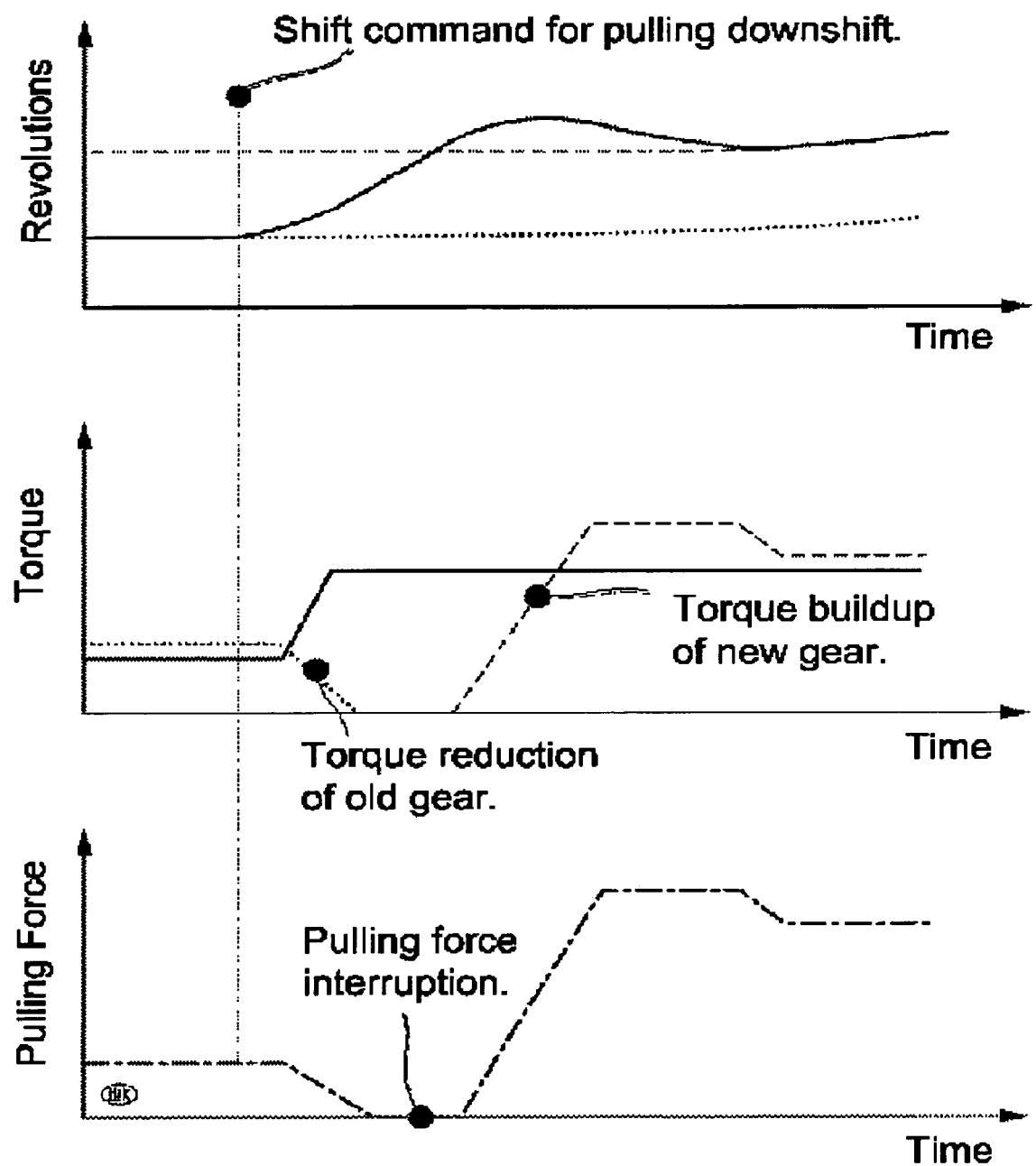
FIG. 2 shows different diagrams with engine and transmission variables in a pulling downshift with a pulling force interruption.

In FIG. 2, a pulling downshift with pulling force interruption is diagrammatically illustrated in a parallel shift transmission using engine and transmission variables. In a top diagram, the engine speed is illustrated over time with a solid line, the speed of the old transmission input shaft (starting gear) with a dotted line and the speed of the new transmission input shaft (target gear) with a dashed line. It is evident that after a successful shift command the engine speed approaches the speed of the new transmission input shaft.

In a central diagram, the engine torque is illustrated over time with a solid line, the torque on the old clutch with a dotted line and the torque on the new clutch with a dashed line. The torque reduction of the old gear and the torque buildup of the new gear are derived from this.

In a bottom diagram, the pulling force at the output is illustrated over time with a dotted and dashed line. From this curve is evident that after the shift command a pulling force interruption is carried out after this torque reduction is concluded until the torque buildup occurs on the new gear. The shown pulling force curve during the pulling downshift of the parallel shift transmission corresponds to the curve in an automated shift transmission (AST).

Figure 3:
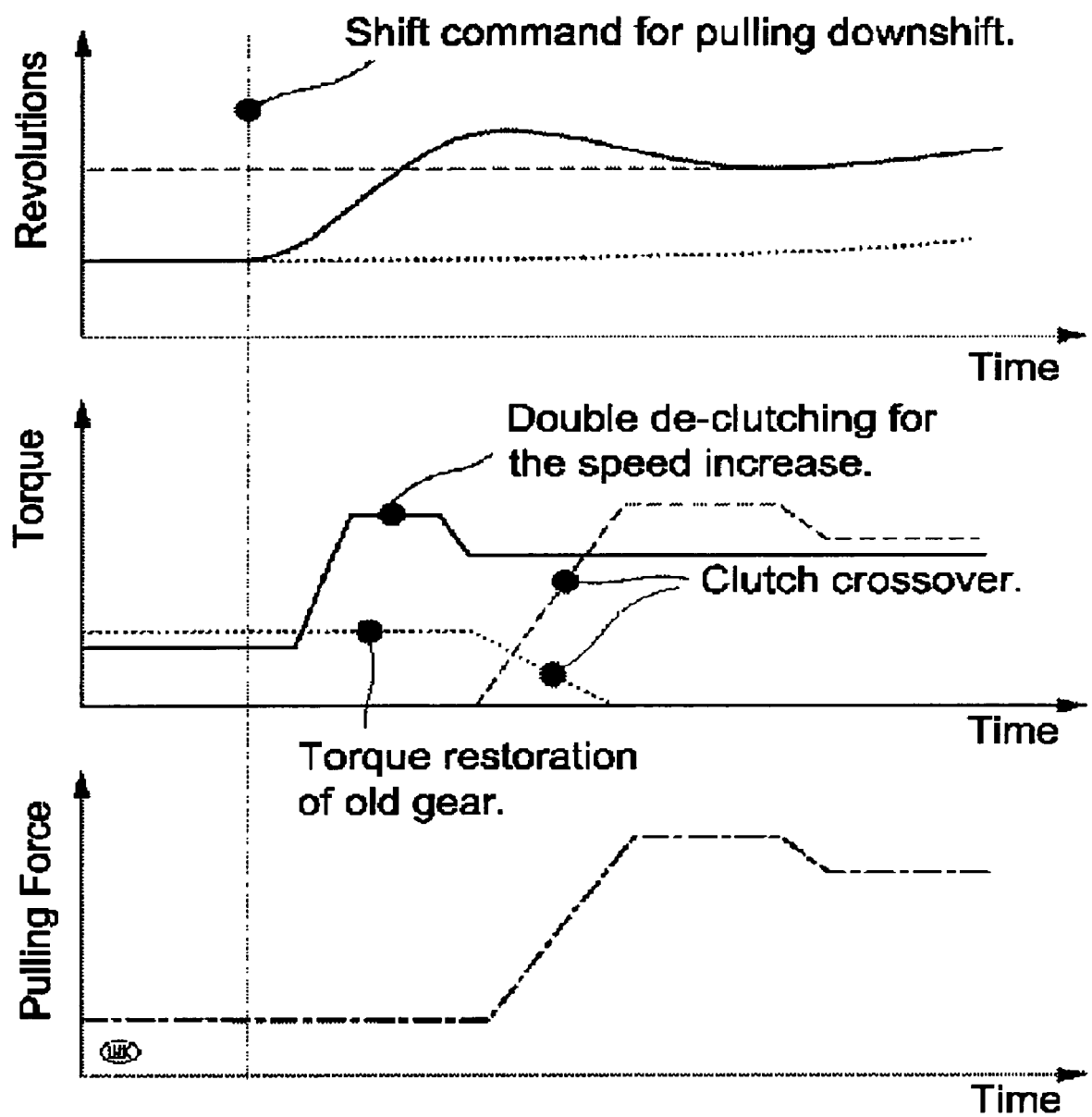
FIG. 3 shows different diagrams with engine and transmission variables in a pulling downshift with a pulling force restoration.

Regarding a converter unit that the parallel shift transmission is supposed to replace completely, a residual top-off torque, for example, can be transmitted to the drivetrain via the clutch of the disengaging gear by a pulling force restoration, while the engine is accelerated to the target speed of the new gear by an engine intervention. This creates the advantage that the drivetrain remains under tension and no disruptive play occurs. This procedure is diagrammatically indicated in FIG. 3, the engine and transmission variables during a pulling downshift in a parallel shift transmission with pulling force restoration being indicated in diagrams. In FIG. 3 the curves of the engine and transmission variables are labeled as in FIG. 2.

Figure 4:
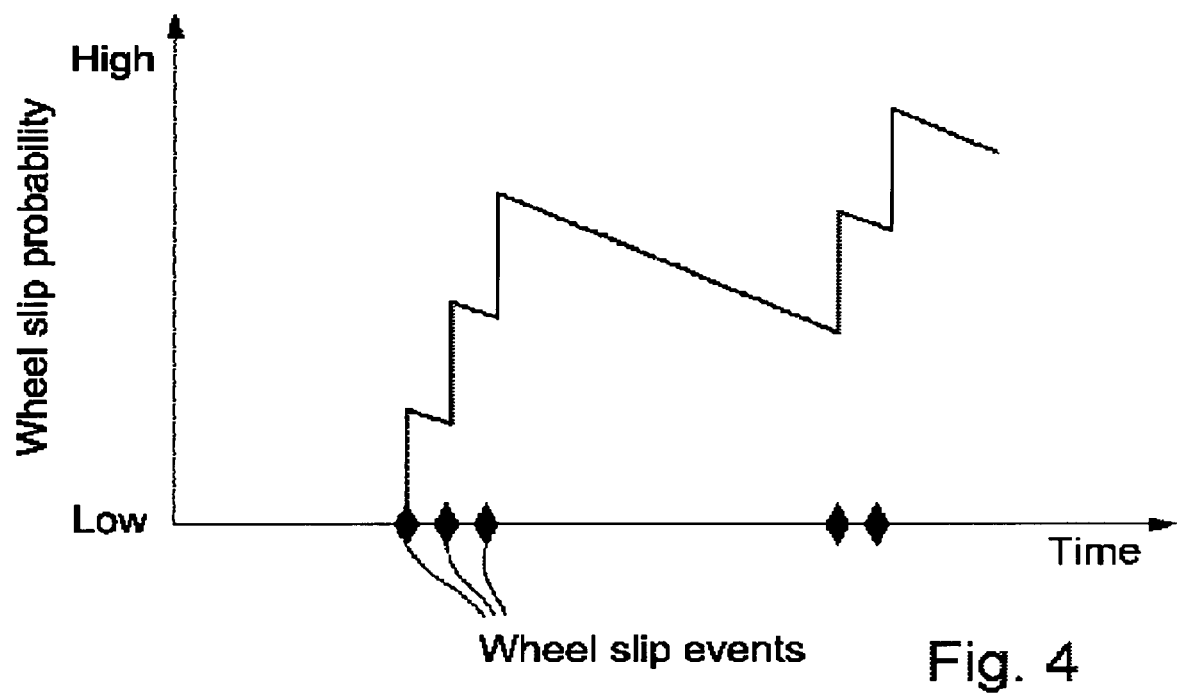
FIG. 4 shows a curve of the wheel slip probability as a function of time.

Illustrated in FIG. 4 is the wheel slip probability over time, each wheel slip event being marked by a diamond. The curve shows that the longer no wheel slip is detected, the lower the wheel slip probability and vice versa.

Figure 5:
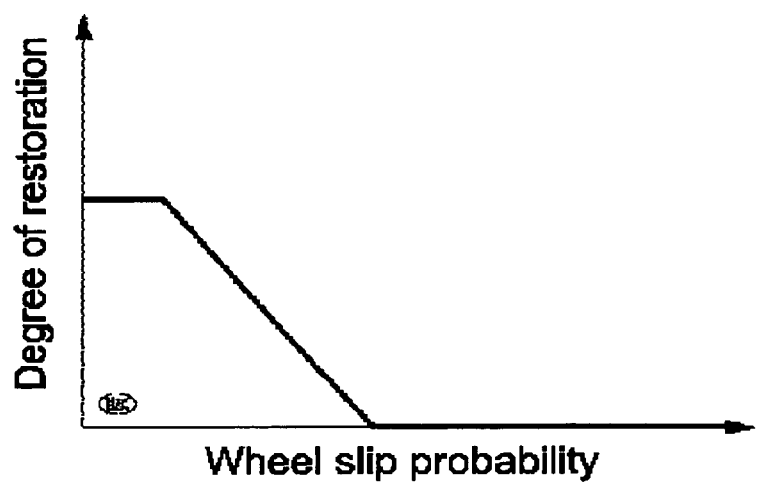
FIG. 5 shows an illustration of the degree of pulling force restoration as a function of the wheel slip probability.

In FIG. 5 the degree of pulling force restoration is illustrated as a function of the wheel slip probability. The curve shows that a continuous reduction of the restoration level is realized as a function of the wheel slip probability, especially during a pulling downshift.

Figure 6:
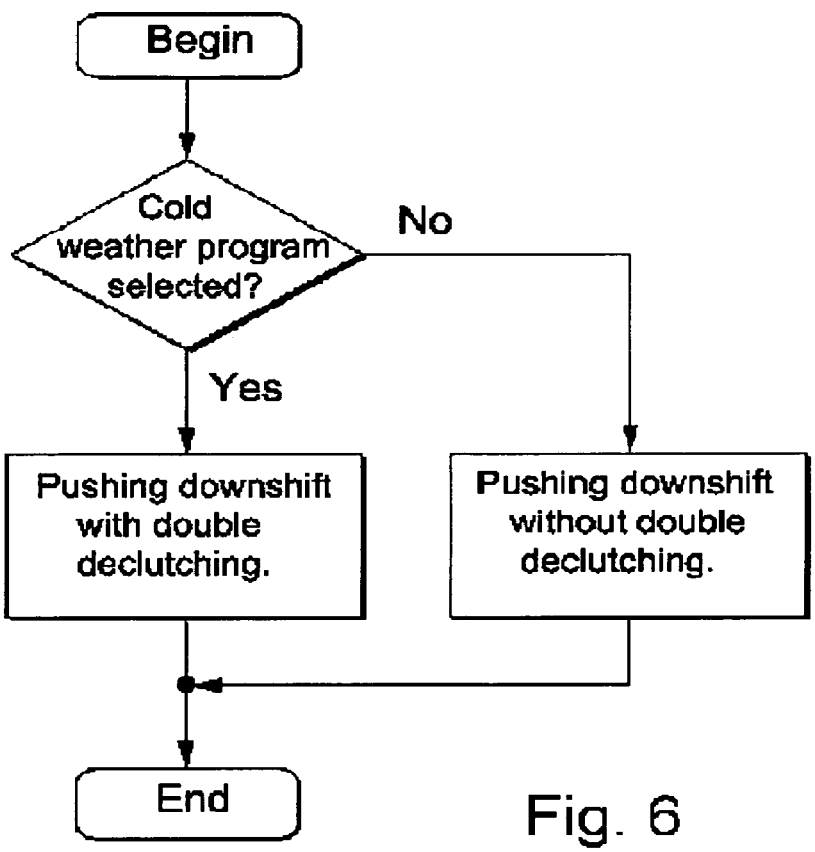
FIG. 6 shows a flow diagram of a second exemplary embodiment of the method of the invention.

In FIG. 6, a second possible exemplary embodiment of the method of the invention is illustrated in reference to a flow diagram.

At the beginning of the method a check is made of whether a low-temperature mode or low-temperature program is activated. If so, a pushing downshift with double-declutching is carried out. If not, a pushing downshift without double-declutching is carried out. After that the process is terminated.

Figure 7:
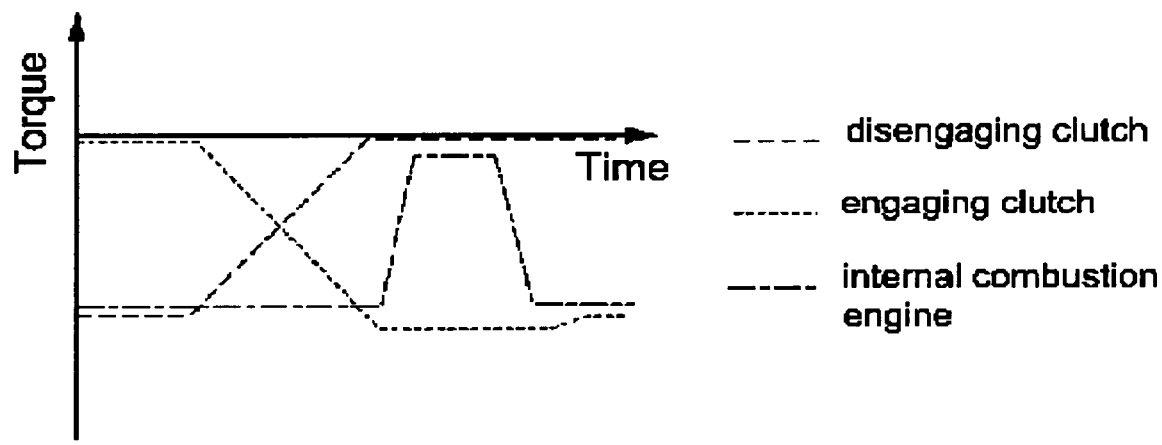
FIG. 7 shows different diagrams with the curves of engine and transmission variables during a pushing downshift with double declutching; and, FIG. 8 shows different diagrams with the curves of engine and transmission variables during a pushing downshift without double-declutching.
Figure 7:
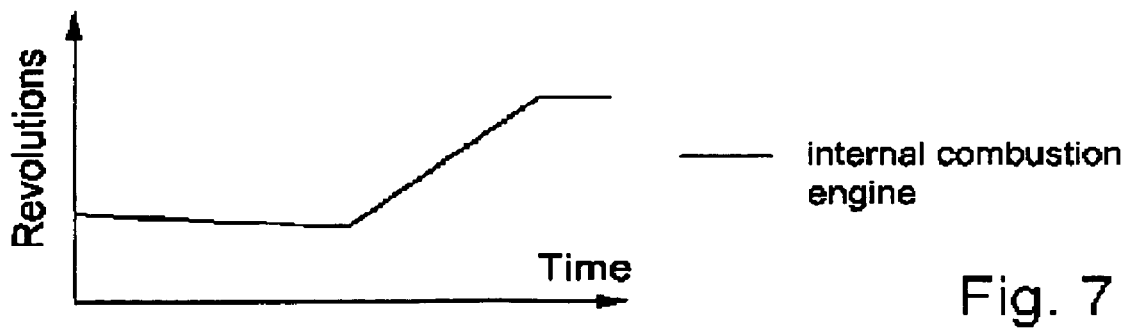

Illustrated in FIG. 7 are diagrams with the curves of engine and transmission variables during a pushing downshift with double-declutching in a parallel shift transmission or a twin-clutch transmission.

In a top diagram, the curve of the engine torque is illustrated over time with a dotted and dashed line, the curve of the torque on the old disengaging clutch with a dashed line and the curve of the torque on the new engaging clutch with a dotted line. These curves are produced if, for example, a cold-weather mode (cold-weather program) is activated that the driver can request by a cold-weather button or cold-weather switch or which the transmission controller can detect automatically by an accumulation of ABS or ESP (Electronic Stability Program) control cycles. By using an engine intervention, it is possible for the clutch of the lower gear in a pushing downshift during slip reduction to build up no overtorque or only minimal overtorque after the gear ratio change. In an advantageous manner, a pushing torque increase in the wheel/street contact is thereby prevented to the greatest possible extent.

Figure 8:
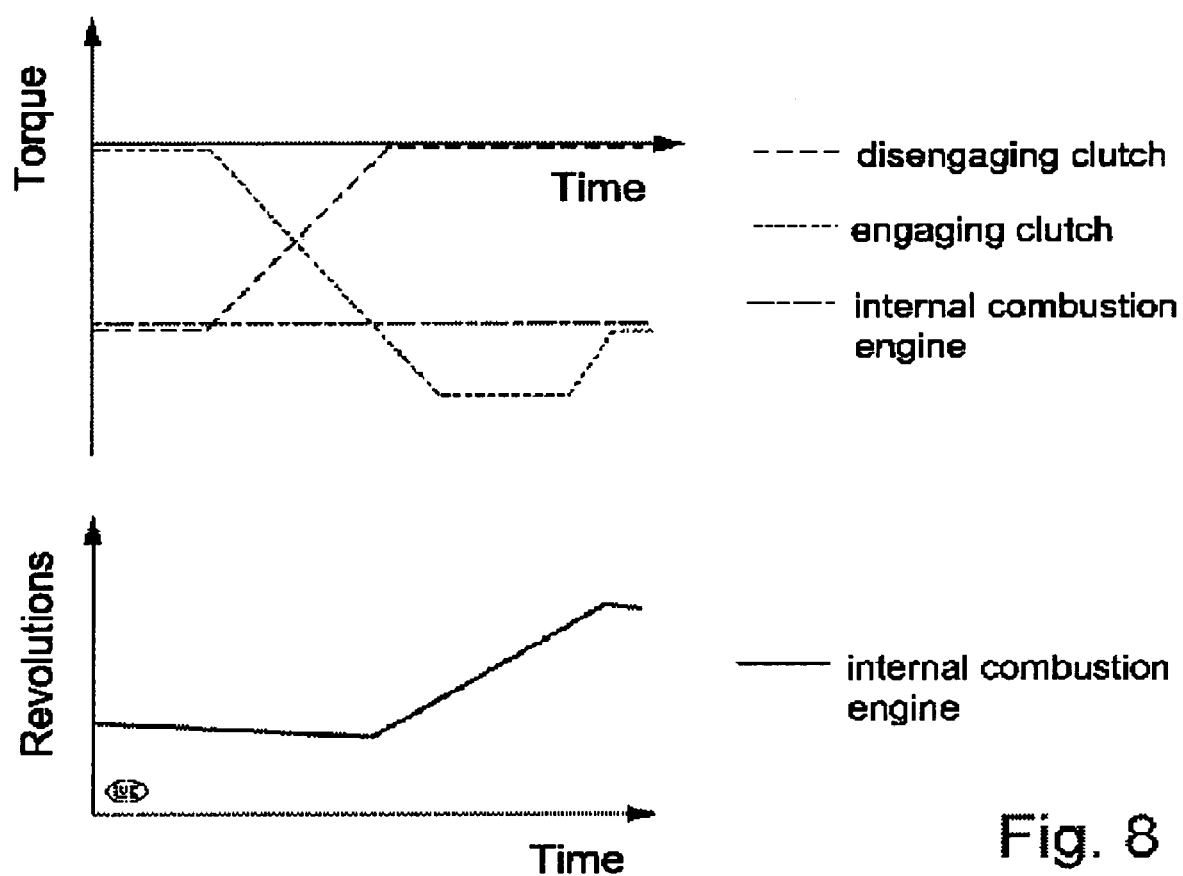

Torque and speed curves during a pushing downshift are also illustrated in FIG. 8, but in this case without double-declutching. The curves here are labeled as in FIG. 7. If no cold-weather program is activated, a pushing downshift may preferably be carried out without double-declutching. Therefore, the vehicle may be operated in push mode in an especially fuel-efficient manner. During the slip reduction after a gear ratio change, the clutch can engage at a higher transmissible torque than the engine drag torque, and as a result the engine speed can increase until the clutch of the new lower gear grips. This arises in particular from the torque curves of the disengaging clutch, the engaging clutch and the internal combustion engine as well as the curve of the engine speed.

In a parallel shift transmission, the largest possible fuel consumption advantage is to be achieved compared to other transmissions. In pushing downshifts, this means that when cold-weather mode is not activated, the double-declutching for engine acceleration may be omitted. In this way, it is possible to achieve a fuel consumption advantage of over 1% during specific driving cycles.

The patent claims submitted with the application are proposed formulations without prejudice to the achievement of further patent protection. The applicant reserves the right to submit claims for further combinations of features previously only disclosed in the description or the drawings.

References used in dependent claims refer to the further development of the subject matter of the principal claim via the features of the particular dependent claims; they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or division declarations. Furthermore, they may also contain independent inventions that have a design that is independent of the subject matter of the preceding dependent claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

What is claimed is:

1. A method for carrying out gear shifting in a twin-clutch transmission, comprising downshifting as a function of at least one predetermined vehicle wheel slip parameter.

2. The method as described in claim 1, further comprising downshifting with a pulling force interruption if said at least one predetermined vehicle wheel slip parameter increases a wheel slip probability.

3. The method as described in claim 1, further comprising downshifting with a pulling force interruption if said at least one predetermined vehicle wheel slip parameter is an activated cold-weather program, wherein said cold-weather program is at least one predetermined vehicle wheel slip parameter.

4. The method as described in claim 2, wherein said wheel slip probability is a function comprising actual wheel slip.

5. The method as described in claim 4, wherein said pulling force interruption is a function comprising said wheel slip probability.

6. The method as described in claim 5, further comprising terminating said pulling force interruption if said wheel slip probability is decreased and initiating a pulling force restoration.

7. The method as described in claim 6, wherein increasing the degree of said pulling force restoration decreases the probability of said wheel slip.

8. The method as described in claim 1, further comprising powering a pushing downshift by means of an engine torque if there is an increased probability of said wheel slip.

9. The method as described in claim 1, further comprising powering a pushing downshift by means of engine torque if a cold-weather program is activated, wherein said cold-weather program is at lease one predetermined vehicle wheel slip parameter.

10. The method as described in claim 8, further comprising increasing said engine torque while said engine torque is powering said pushing downshift for a predetermined time period by a double de-clutching.

11. The method as described in claim 2, further comprising increasing said wheel slip probability if a cold-weather program is activated, wherein said cold-weather program is at least one predetermined vehicle wheel slip parameter.

12. The method as described in claim 2, further comprising increasing said wheel slip probability if at least one wheel slip intervention occurs.

13. A twin-clutch transmission comprising a transmission control device for carrying out downshifting as a function of at least one predetermined vehicle wheel slip parameter.

14. The twin-clutch transmission as described in claim 13, wherein said transmission control device can recognize said at least one predetermined vehicle wheel slip parameter.

15. The method as described in claim 12, wherein said at least one wheel slip intervention is Accelerated Slip Regulation (ASR).

16. The method as described in claim 12, wherein said at least one wheel slip intervention is Anti-Lock Braking System (ABS).

17. The twin-clutch transmission as described in claim 14, wherein said at least one predetermined wheel slip parameter includes an activated Cold-Weather program.

18. The twin-clutch transmission as described in claim 14, wherein said at least one predetermined wheel slip parameter includes an Anti-Lock Brake System engaging.

19. The twin-clutch transmission as described in claim 14, wherein said at least one predetermined wheel slip parameter includes an Electronic Stability Program engaging.

20. The twin-clutch transmission as described in claim 14, wherein said transmission control device will downshift with a double declutching if said transmission control device recognizes said at least one predetermined vehicle wheel slip parameter, and said transmission control devices will downshift without said double declutching if said transmission control device does not recognize said at least one predetermined vehicle wheel slip parameter.

* * * * *